UNITED STATES PATENT OFFICE.

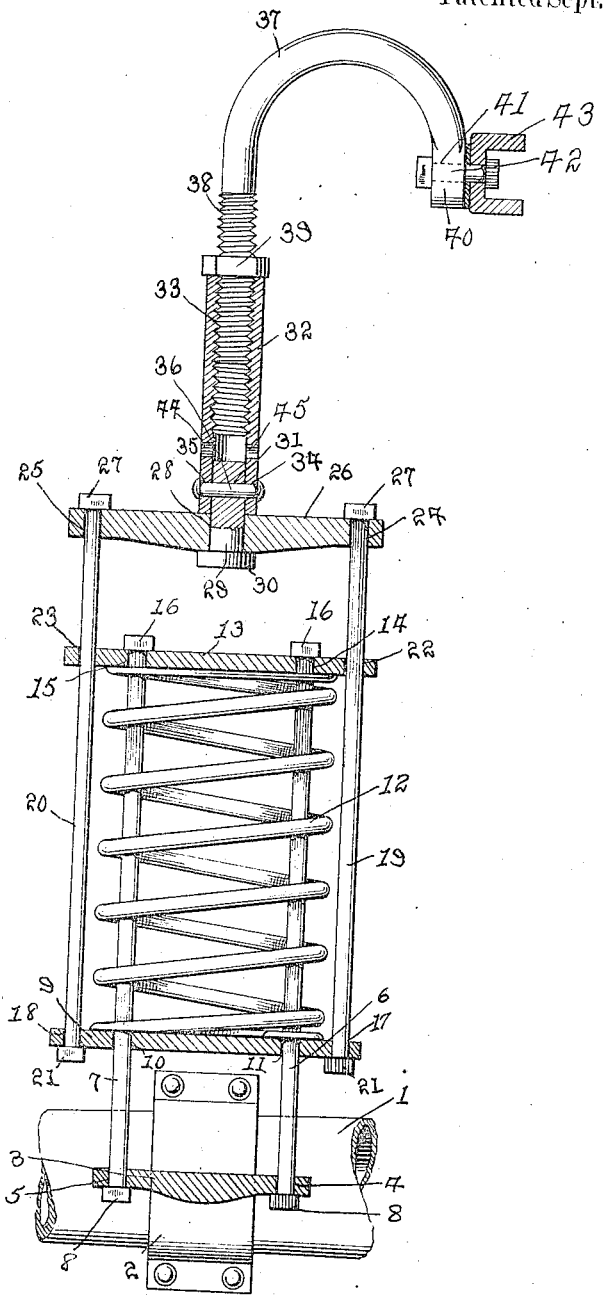

WILLIAM N. BORDER, OF DUNLAP, MISSOURI.

SHOCK-ABSORBER.

1,154,284. Specification of Letters Patent. Patented Sept. 21, 1915.

Application filed October 24, 1914. Serial No. 868,434.

*To all whom it may concern:*

Be it known that I, WILLIAM NICHOLAS BORDER, a citizen of the United States, residing at Dunlap, in the county of Grundy and State of Missouri, have invented certain new and useful Improvements in Shock-Absorbers; and I do hereby declare the following to be a full, clear, and exact description of the invention, such as will enable others skilled in the art to which it appertains to make and use the same.

This invention relates to shock absorbers and especially to shock absorbers for automobiles and it has for its object the general improvement of the construction and operation of such devices.

With this object in view, the invention consists in the improved construction, arrangement and combination of the parts hereinafter fully described and afterward specifically claimed.

I have illustrated an approved embodiment of my invention in the accompanying drawings in which the single figure represents the invention in elevation, partly in section, showing means for attaching it to the frame and the axle of an automobile.

In the drawing 1 indicates the axle having a bushing 2 thereon with flanges 3, approximately horizontal and having near their edges suitable apertures or openings 4 and 5 for the reception of the stay rods 6 and 7 which are retained therein by enlarged heads 8. A suitable plate 9, having similar apertures 10 and 11 registering with the apertures 4 and 5 is mounted upon the stay rods 6 and 7 in such manner as to support thereon a coiled shock-absorbing spring 12, the coils of which inclose the stay rods 6 and 7. A plate 13 similar in construction to the plate 9 is mounted upon the upper ends of the stay rods 6 and 7, being passed through suitable apertures 14 and 15 in said plate 13 for this purpose and said plate 13 is locked upon said stay rods by means of heads 16. This plate 13 holds the spring 12 between it and the plate 9. Suitable apertures 17 and 18 are formed in the plate 9 adapted for the reception of other stay rods 19 and 20, the heads 21 of these stay rods being enlarged to prevent their displacement from the plate 9. These stay rods pass through suitable apertures 22 and 23 in the plate 13 in such manner as to allow said plate to slide or reciprocate on said stay rods. The ends of the stay rods 19 and 20 are passed through suitable apertures 24 and 25 in a yoke 26, the heads 27 thereof being enlarged to retain said stay rods within the yoke. An aperture 28 is centrally formed in said yoke and is adapted to loosely seat a swivel bolt 29, having an enlarged head 30 to prevent the same from passing through said aperture.

A sleeve 32 having the interior upper end portion thereof threaded as indicated at 33 is mounted over the swivel bolt 29 and has oppositely disposed apertures 34 and 35 which register with a bore 31 in bolt 29 so that a rivet 36 passed through them will fasten the sleeve 32 to the swivel bolt in such manner as to prevent longitudinal play but to permit swivel action.

A goose neck bolt 37 having a threaded end 38 is threaded into the upper portion of the sleeve 32 and is locked in position by means of a lock nut 39. The opposite end of the goose neck bolt 37 is enlarged as at 40 and has an aperture 41 therethrough adapted to seat a connecting bolt 42, which carries a channel connecting member 43 adapted to be suitably fastened upon the frame of a vehicle.

Previous to the riveting of the sleeve 32 upon the bolt 29, said sleeve 32 is adjusted upon the goose neck bolt 37, being turned for this purpose by a key inserted in suitable apertures 44 and 45, the lock nut 39 then being threaded home and the rivet 36 secured in place.

In operation my assembled device is mounted between the axle and the body or frame of an automobile or other vehicle in such manner that the spring 12 will be under a continuous tension so that the same will always absorb the shocks received when the vehicle is running. This operation causes the plate 9 to slide over the stay bolts 6 and 7 and the plate 13 to slide over the stay bolts 19 and 20.

Having now described my invention what I claim as new and desire to secure by Letters Patent is:—

1. A shock absorber comprising means for connecting it to the axle of an automobile, adjustable means for connecting it to the frame or body of an automobile, a yoke swiveled to the body connections, a pair of stay rods slidably mounted through the yoke, a plate mounted upon the opposite ends of the stay rods, a second plate slidable on the stay rods between the yoke and the first mentioned plate, a second pair of rods slidably mounted through the two plates, and a coil spring mounted between the two plates.

2. A shock absorber comprising a plurality of stay rods, a plurality of plates connecting said stay rods, a coil shock absorbing spring mounted between said plates and encircling a portion of said stay rods, a yoke mounted upon the opposite end of a portion of said stay rods having a circular aperture therethrough, a swivel bolt mounted through said aperture, a sleeve riveted to said swivel bolt in such manner as to allow swivel play thereof, a goose neck bolt adjustably threaded into said sleeve, locking means locking said goose neck bolt to said sleeve and connecting means upon the opposite end of said goose neck bolt adapted to attach the same to the body of a vehicle.

3. A shock absorber comprising reciprocating plate means, plate retaining means, shock absorbing means between said plate and said retaining means, a yoke, a swivel bolt mounted through said yoke, a sleeve riveted to said bolt having an internally threaded end portion, an adjustable member threaded into said sleeve, locking means locking said last mentioned member to said sleeve, and connecting means upon the opposite end of said adjustable member adapted to connect the same to the body of a vehicle.

In testimony whereof I have signed my name to this specification in the presence of two subscribing witnesses.

WILLIAM N. BORDER.

Witnesses:
W. T. PORTER,
R. V. PUPPITT.